United States Patent

[11] 3,611,341

[72] Inventors David T. Craig
 Utica;
 William F. Gavin, Rome; Robert B. Curtis,
 New York Mills, all of N.Y.
[21] Appl. No. 760,305
[22] Filed Sept. 17, 1968
[45] Patented Oct. 5, 1971
[73] Assignee The United States of America as
 represented by the Secretary of the Air
 Force

[54] PRESSURE-MAGNETIC DETECTION SYSTEM
 2 Claims, 8 Drawing Figs.
[52] U.S. Cl. .................................................. 340/258,
 174/9.5, 310/8.3, 340/420
[51] Int. Cl. .................................................. G08b 13/20,
 G08b 13/24
[50] Field of Search ....................................... 340/258,
 258 C, 261, 420, 38 L, 409; 324/45; 310/8.3;
 174/9.5

[56] References Cited
UNITED STATES PATENTS

| | | | |
|---|---|---|---|
| 362,010 | 4/1887 | Jewill ......................... | 340/420 |
| 3,346,842 | 10/1967 | Dixon .......................... | 340/38 |
| 2,537,298 | 1/1951 | Baughman .................... | 340/258 |
| 2,652,551 | 9/1953 | Gumpeitz et al. ............. | 340/258 X |
| 2,709,251 | 5/1955 | Schmidt ....................... | 340/258 X |
| 2,983,852 | 5/1961 | Gray ............................. | 340/258 X |
| 3,109,165 | 10/1963 | Bagno .......................... | 340/258 |
| 3,371,272 | 2/1968 | Stanton ........................ | 340/258 |
| 3,438,021 | 4/1969 | Nelkin et al. ................. | 340/261 |

OTHER REFERENCES
Enderby, The Hall Effect in Liquid Metals, 1963, Proc. Phys. Soc., Vol. 81 p. 772-779

Primary Examiner—John W. Caldwell
Assistant Examiner—Perry Palan
Attorneys—Harry A. Herbert, Jr. and Julian L. Siegel ABSTRACT: Detection system sensitive to both magnetic and pressure changes having a fluid filled hose integrated with an electrical conductor. The conductor can be either a single coiled wire, a wire mesh, or the fluid itself. Pressure changes are converted to electrical signals by a piezoelectric transducer.

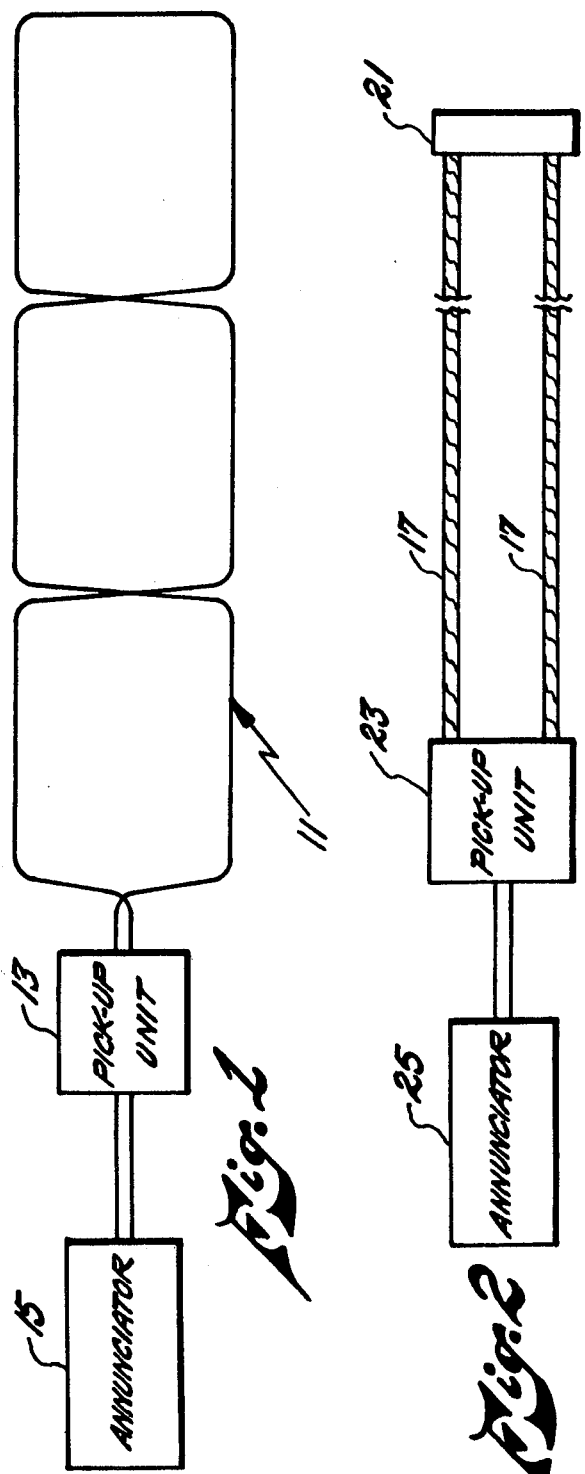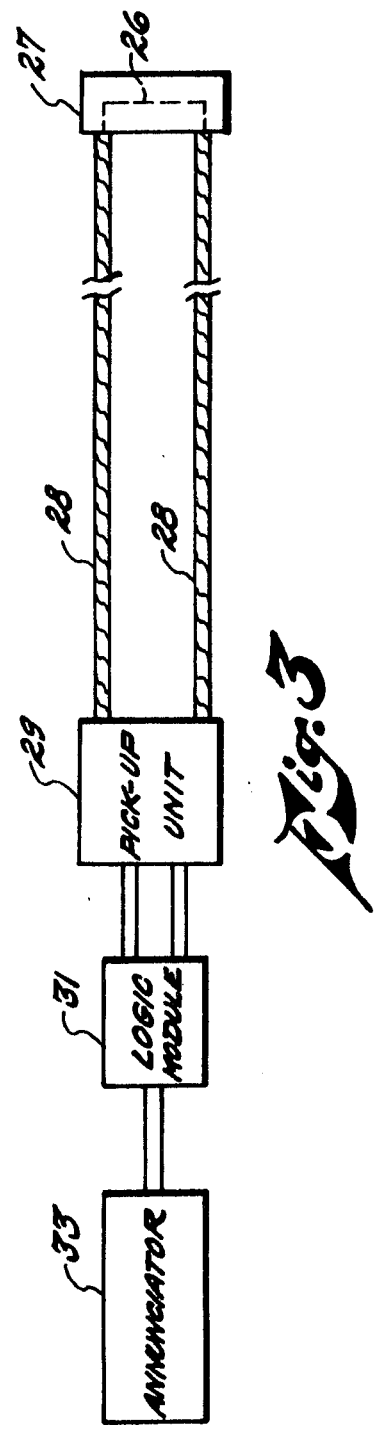

PATENTED OCT 5 1971 3,611,341

PRESSURE-MAGNETIC DETECTION SYSTEM

BACKGROUND OF THE INVENTION

This invention relates to a detection system and, more particularly, to integrated magnetic and pressure sensors.

The most commonly used perimeter security system depends upon buried lines for the sensor elements. In one type the line is a wire which detects variants in the earth's magnetic field created by the introduction of ferrous metal. In the second, a fluid filled hose detects the pressure variant caused by the presence of an intruder. In each system the output of the sensor is processed through a detection unit and transmitted to an annunciator for visual and/or audio display. The invention encompasses several techniques for combining the individual sensor elements to a single sensor providing a complementary detection capability.

The use of a single integrated sensor enhances the performance of the system by providing the improved discrimination inherent in two complementary systems, while reducing the installation time to that of a single system.

The equipment can be used to provide a perimeter detection system for areas containing vital resources and will detect, locate, discriminate, and announce the overt or covert penetration of the perimeter of interest. It may be so configured as to be monitored for appropriate action by a properly located security mobile force.

BRIEF SUMMARY OF THE INVENTION

The present invention discloses a single sensor consisting of a fluid filled hose integrated with an electrical conductor. The integration can be accomplished by embedding a single wire or wire mesh in the hose or by using the fluid itself as a conductor. The pressure changes are converted to electrical signals by a piezoelectric transducer and pickup unit receives signals from both the magnetic and pressure sensors.

It is, therefore, an object of the invention to provide an improved detection system.

It is another object to provide a detection system using a single sensor for both magnetic and pressure sensors.

It is still another object to provide an integrated magnetic-pressure detection system where an enclosed fluid serves as both the pressure medium and an electrical conductor.

These and other advantages, features and objects of the invention will become more apparent from the description taken in connection with the illustrative embodiments in the accompanying drawings where like reference numerals identify like elements in the several drawings.

BRIEF DESCRIPTION OF THE DRAWINGS

FIG. 1 is a block diagram of a magnetic detection system;
FIG. 2 is a block diagram of a pressure detection system;
FIG. 3 is a block diagram of the combined system which is an embodiment of the invention.

DETAILED DESCRIPTION OF THE INVENTION

Figure 4C:
FIGS. 4a, 4b, and 4c show combined magnetic-pressure sensors.

The magnetic system shown in FIG. 1 consists basically of three components. Magnetic sensor 11 is a continuous wire transposed to form loops that can be approximately 4 feet wide by 7 feet long and the total length could extend out to 1,000 feet. Pickup unit 13 receives the small signals generated in sensor 11 when metal passes over the wire. Pickup unit 13 then amplifies these signals and, if they exceed a preset threshold, send an alarm signal to annunciator 15, which announces the intrusion with an aural and/or visual alarm. Such pickups are well known in the art, such as crystal pickups which are shown and described in Source Book of Electronic Circuits, by Marcus, (McGraw Hill, 1968). Annunciator 15 is a standard commercially available unit such as "Sonalert"; by Mallory. It can be seen that cable or sensor 11 must be transposed as it is being deployed which is necessary to null out the everyday variations in the earth's magnetic field. These essentially affect each loop the same way at the same time, whereas a local disturbance will affect one loop before the other and will then trigger an alarm.

Referring to FIG. 2 which shows the pressure sensor consisting basically of two hoses 17 containing a fluid and separated by a few feet and extending up to 1,000 feet in length. Termination 21 seals hoses 17 to prevent leakage of the fluid from the system. Pickup unit 23 contains a flexible diaphragm and a transducer such as piezoelectric crystal that convert the disturbances in the fluid into electrical signals. These signals are then amplified and, if they exceed a preset threshold, are sent as alarm signals to annunciator 25. Annunciator 25 receives the alarm signal from pickup unit 23 and announces the intrusion with an aural and/or visual alarm. Footsteps cause a pressure change in the liquid which flexes the diaphragm and stresses the piezoelectric crystal. This stress causes a signal to be generated and announces that an intrusion has taken place.

Referring now to FIG. 3 which shows the combined pressure and magnetic detection system. Termination 27, in addition to sealing the hoses or sensors 28 against leakage, provides electrical connection at 26 between hoses to maintain continuity for the magnetic portion of sensors 28. Pickup unit 29 receives signals from sensors 28, amplifies them and sends them over separate pairs of wires to logic module 31 which determines when both signals exceed threshold values within a specific time period. Only then will it transmit an alarm signal over a single pair of wires to annunciator 33 which signals an intrusion by aural and/or visual alarm. Logic module 31 can be fabricated from logic circuitry that is commercially available and is also shown and described in Source Book of Electronic Circuits, as cited above.

Figure 4B:
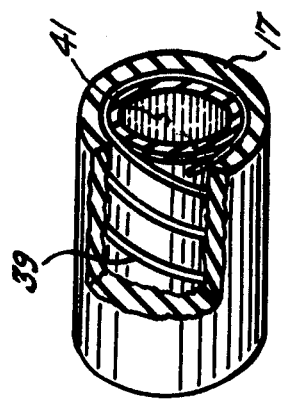
Figure 4A:
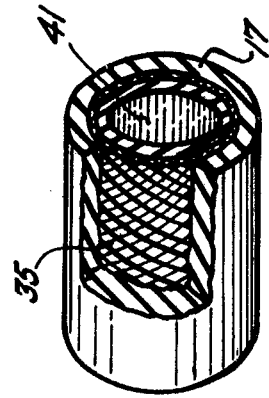

The present invention combines the two sensors explained above. FIG. 4 shows three possible methods of combining the hoses or sensors. In FIG. 4a, the metal detector is wire mesh 25 embedded in pressure hose 37 and containing fluid 41. FIG. 4b shows the metal detector as an embedded wire coil 39. The third method is shown in FIG. 4c where conducting fluid 41 is used as both the pressure sensor and the electrical conductor for the magnetic system. Such a fluid could be any ion solution of magnetic material, such as copper mitrate. Other examples of desirable fluids can be found in Handbook of Chemistry and Physics, published by the Chemical Rubber Company.

The output of the pressure system is taken directly from the piezoelectric transducer contained in the pickup unit. The output of the magnetic system is taken directly from mesh 35 or wire 39 in the cases shown in FIGS. 4a and 4b.

Figure 5B:
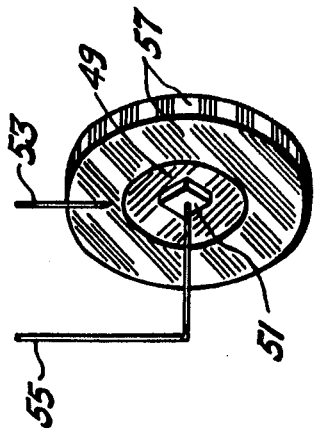
FIGS. 5a and 5b show diaphragms for electrically conducting fluids.
Figure 5A:
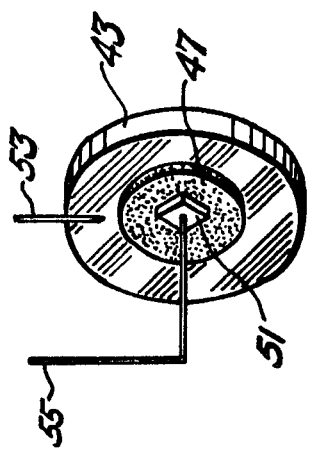

For the electrically conducting fluid system of FIG. 4c, two possible methods of connection are shown in FIG. 5. In FIG. 5a, diaphragm 43 is a conductor that makes direct contact to the fluid. Piezoelectric transducer 51 is bonded to diaphragm 43 by means of nonconducting bonding agent 47. An alternate method is shown in FIG. 5b where a nonconducting diaphragm 49 is plated on both sides with conducting thin film 57 using a circle mask on the front side for electrical isolation. Transducer 51 is then bonded to this section of diaphragm 49. Magnetic outputs at 53 and pressure outputs at 55 are then fed into logic circuitry which combines the signals from the sensors and relays the signals to the annunciator when there is an intrusion. The circuitry can be designed such that the transposition of the cable with the magnetic system will not be necessary.

While the invention has been described in the preferred embodiments, it is understood that the words which have been used are words of description rather than words of limitation and that changes within the purview of the appended claims may be made without departing from the scope and spirit of the invention in its broader aspects.

What is claimed is:
1. A pressure-magnetic detection system comprising:

a. a hose containing a fluid and an electrical conductor in the form of a wire mesh embedded within the hose;
b. means for detecting magnetic changes of the electrical conductor;
c. means for detecting pressure changes from disturbances in the fluid, the pressure detecting means including a piezoelectric transducer in contact with the fluid; and
d. a logic module connected to the pressure and magnetic detecting means and providing an output upon coincidence of pressure and magnetic detection;
e. an annunciator connected to the logic module.

2. A pressure-magnetic detection system comprising:
a. a hose containing an electrical conductor in the form of a fluid;
b. means for detecting pressure and magnetic changes of the electrical conducting fluid including a circular diaphragm mounted at one extreme of the hose in surface contact with the fluid and having an outer ring with an electrically conducting surface and a piezoelectric transducer mounted within the outer ring and insulated therefrom; and
c. a logic module connnected to the pressure and magnetic detecting means and providing an output upon coincidence of pressure and magnetic detection;
d. an annunciator connected to the logic module.